July 19, 1949.  J. H. McLEOD  2,476,426
APPARATUS FOR TESTING PORRO PRISMS
USING NONPARALLEL LIGHT
Filed May 2, 1945  2 Sheets-Sheet 2

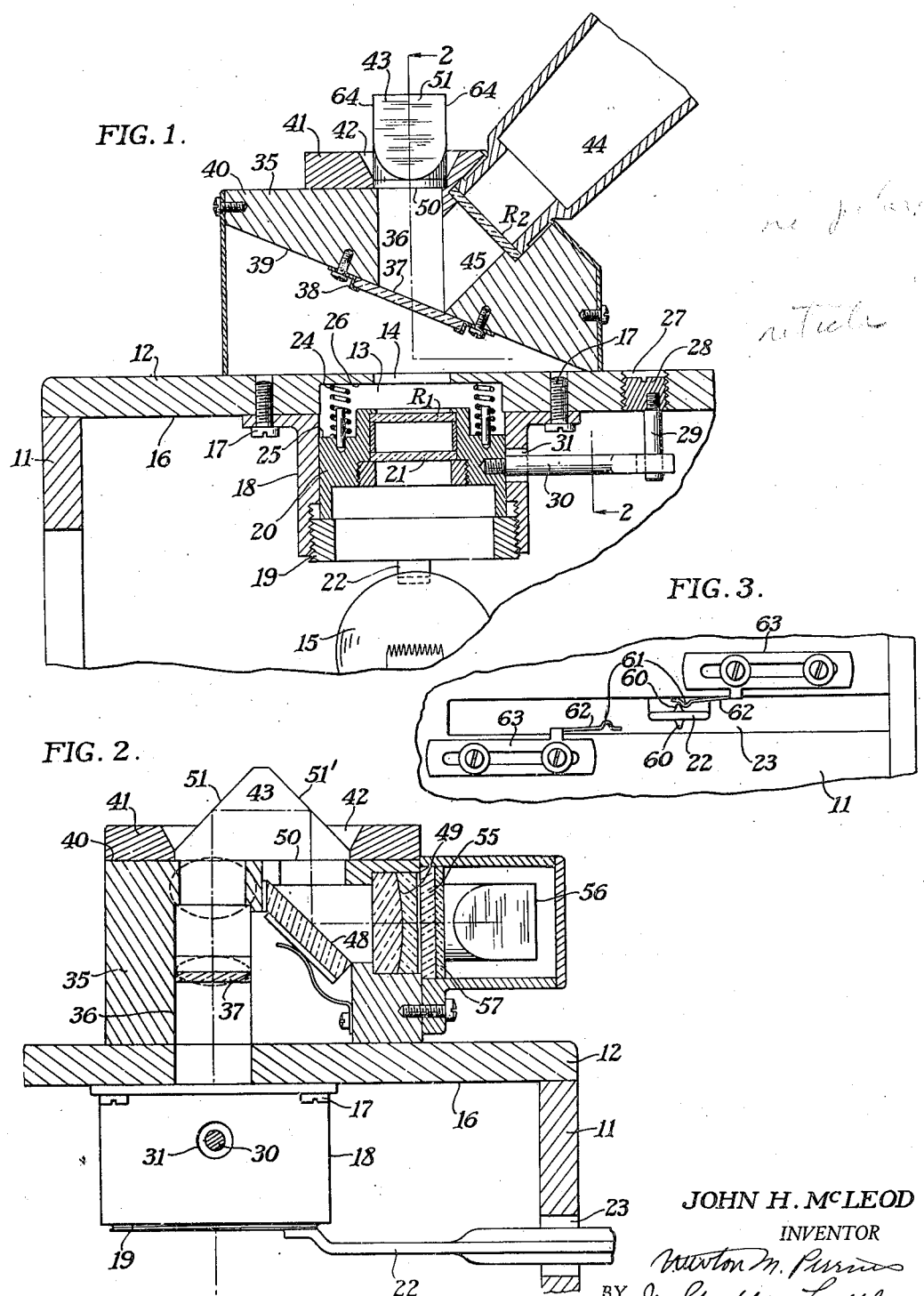

JOHN H. McLEOD
INVENTOR

BY *[signatures]*
ATTORNEYS

Patented July 19, 1949

2,476,426

UNITED STATES PATENT OFFICE 2,476,426

APPARATUS FOR TESTING PORRO PRISMS USING NONPARALLEL LIGHT

John H. McLeod, Rochester, N. Y., assignor to Eastman Kodak Company, Rochester, N. Y., a corporation of New Jersey Application May 2, 1945, Serial No. 591,501

7 Claims. (Cl. 88—14)

The present invention relates to a testing instrument, and more particularly to an instrument for testing prisms in converging or nonparallel light in the same manner as when used in binoculars to determine the presence of various errors of such prisms.

As is well known, a pair of Porro prisms are used to erect the image in a telescope or binocular. Each prism serves to deviate the light 180°. Such a prism, referring to the drawings which will hereinafter be described in detail, has two internally reflecting faces 51 and 51' perpendicular to each other and to the triangular faces 64, and at an angle of 45° to the hypotenuse face 50. The light enters the hypotenuse 50 of each prism and is totally reflected internally by each of the two reflecting faces 51 and 51' and then emerges from the other end of the hypotenuse 50. Such prisms may have errors of various kinds, and these errors may produce various errors in the telescope or binoculars. These errors are as follows:

I—Deviation errors 1. 90-degree angle error, that is the amount by which the angle between the faces 51 and 51' differs from a right angle.

2. Pyramid error, that is, the tilt or angle by which the line B, constituting a 90-degree edge, differs from parallelism with the hypotenuse face 50.

II—Displacement errors

1. Sharp dimension errors, which means the amount by which the prism is, as a whole, larger or smaller than the standard size. This may be measured either by variation in the length A of the hypotenuse face 50, or in the distance of the line B from the hypotenuse 50.

2. Lateral displacement of the 90-degree edge B. When the right angle is accurate, errors in the 45-degree angles, one being larger and the other smaller than 45° by an equal amount, will result in the displacement of the edge B.

3. Inequalities of the bevels. That is instead of the bevels being of equal length and cutting off equal portions of the apex of the 45-degree angles, one cuts off more than the other thus throwing the right angle B off center.

III—Rotation errors

That is, errors caused by sides 64 of the prism not being normal to the reflecting surfaces, having the effect of rotating the system about an axis passing through the hypotenuse.

If the 90-degree angle is in error, there will be a deviation from 180°; but if a pyramid error is present, the deviation will be at an angle of 90° from that caused by the 90-degree-angle error. Displacement errors are not detectable in parallel light so that non-parallel light must be used to detect these errors. Accordingly, I mount the prism to be measured between the reticles and a collimating lens, that is, at a point where the rays are not parallel.

If the sharp dimension $a$, Fig. 5, of the prism is in error, the length of the light path through the prism is changed and converging light will focus at a different point. Thus, in a sense, a Porro prism has a focal length. If the two 45-degree angles are unequal, a displacement of the converging light occurs but no deviation from 180°.

The other displacement errors have to do with the mounting of the prism. In binoculars, each Porro prism is mounted in a recess that fits over the hypotenuse surface. The bases or parallel sides and the beveled 45-degree edges locate the prism. If the two bevels of the 45-degree edges are unequal, the prism is displaced lengthwise and a displacement of the image occurs. The displacement may added to or counteract the displacement due to the unequal 45-degree angles.

The two bases or parallel sides of the prism serve to prevent rotation of the prism in the plane of the hypotenuse. If the prism rotates, it serves to rotate the image and is somewhat serious in binoculars. This means that the bases or parallel sides must meet the hypotenuse in lines which are perpendicular to the 90-degree edge in order to eliminate rotational errors.

Errors of deviation and errors of displacement are combined in a telescope. If errors of deviation and displacement are both present in a prism their effect, at the image plane, will add algebraically. If the prism is far from the reticle, deviation errors are the more important. If, on the other hand, the prism is near the reticle, errors of displacement are of prime importance.

In order to ascertain the suitability of the Porro prism for use in binoculars, the prism must be tested to determine which of these errors are present, and if present, whether they are within the established tolerance limits.

The invention has, therefore, as its principal object the provision of an apparatus for determining the various errors of a Porro prism and indicating the amount of such errors.

A further object is the provision of an apparatus that magnifies the error, in this case makes each twice its actual value.

A still further object of the invention is the provision of such an apparatus which affords a ready, easy and reliable testing of such prisms.

And still another object of the invention is the provision of an instrument of this type which is of a rugged construction suitable for use in production control.

Still another object of the invention is the provision of an apparatus of this type which enables the operator to determine whether the errors present are within the permissible tolerance limits.

To these and other ends, the invention resides in certain improvements and combinations of parts, all as will be hereinafter more fully described, the novel features being pointed out in the claims at the end of the specification.

In the drawings:

Fig. 1 is a vertical sectional view through a portion of the testing apparatus of the present invention, showing the position of the various optical members and the relation thereto of the prism to be tested;

Fig. 2 is a sectional view through the testing apparatus, on line 2—2 of Figure 1 and at right angles to that shown in Fig. 1;

Fig. 3 is a fragmentary view of the outside of the apparatus, showing the handle for moving the reticle, and the limiting stops therefor;

The same reference numerals throughout the various views indicate the same parts.

Figure 4:
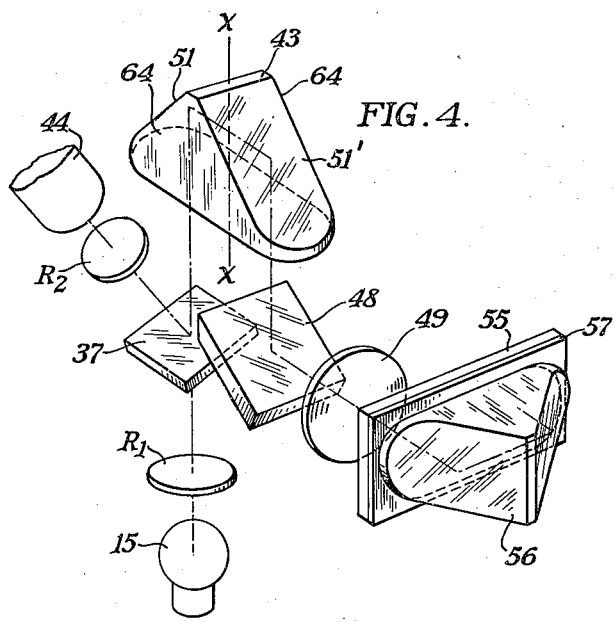
Fig. 4 is a schematic arrangement of the testing apparatus showing the relation of the prism to be tested, and Figs. 5 to 8, inclusive, are the diagrams referred to in the discussion of the prism errors under observation.

The drawings show a hollow housing which has sides 11 and a top 12. The latter is provided with a recessed portion 13 and an opening 14 positioned in optical alignment with a lamp 15 mounted in the housing. The under side 16 of the top 12 has secured thereto, by bolts 17, a depending ring or sleeve 18, the lower end of which is internally threaded with a steep pitch thread to receive a similarly threaded sleeve 19 which supports the lower end of an axially movable mount 20 which carries the reticle $R_1$. An opal or frosted glass 21 is positioned in the mount 20 below the reticle $R_1$ to provide uniform illumination for the latter. To permit axial movement of the mount 20 and reticle $R_1$, for reasons to be later described, the sleeve 19 has secured thereto an arm 22 which projects laterally through an opening 23 in one of the sides 11, as shown in Fig. 2. Thus by moving the arm 22 in one direction, the sleeve 19 will be rotated to move upwardly along the threads of the sleeve 18. This will serve to move the mount 20 and reticle $R_1$ upwardly against the action of the coil springs 24 positioned between the upper face 25 of the mount 20 and the under surface 26 of the recess 13. When, however, the arm 22 is moved in the opposite direction, the sleeve 19 moves downwardly, and the mount 20 is similarly moved under the action of the springs 24 to move the reticle $R_1$ downwardly. Thus the arm 22 and springs 24 serve to move the reticle $R_1$ up and down along the optical axis of the apparatus, for a purpose to be later described.

In order to adjust the azimuth of the reticle $R_1$, an opening 27 in the top 12 is threaded to receive a slotted adjusting nut 28 on which is eccentrically mounted a depending pin 29 the lower end of which engages the end of the radially extending rod 30 which projects through an opening 31 formed in the sleeve 18 and extends into mount 20, all as shown in Fig. 1. Thus by rotating the slotted nut 28, the mount 20 may be slightly rotated to adjust the azimuth of the reticle $R_1$.

The top 12 has mounted thereon a supporting member 35 formed with a vertical opening 36 in optical alignment with the lamp 15 and aperture 14, as illustrated in Fig. 1. The lower end of the opening is closed by an inclined semi-transparent mirror 37 mounted in a frame 38 secured to the inclined bottom 39 of the member 35, as shown in Fig. 1.

The top 40 of the member 35 carries a plate 41 formed with a recess 42 arranged in optical alignment with the opening 36 and providing a seat for a Porro prism 43 to be tested. By means of this arrangement, the prism 43 is positioned in the path of the light rays emitted by the lamp 15 and passing through the reticle $R_1$ and semi-transparent mirror 37. Thus, the prism 43 is positioned in the system between the reticle $R_1$ and the collimating lens, that is, in a beam the rays of which are not parallel. The prism 43 thus constitutes part of the optical system through which the light beam passes by a double internal reflection from the sides 51 and 51' of the prism, as is apparent. An eye-piece or microscope 44 is carried by the member 35 and is arranged in alignment with the opening 45 connecting the device 44 with the mirror 37, as shown in Fig. 1, so that the image reflected by the mirror may be viewed. As such eye-pieces are well known, details thereof are not deemed necessary. A plan mirror 48 serves to direct the beam reflected by the prism 43 to a collimating lens 49 from which the light rays pass in parallel relation, as is well known. The mirror 48 is used merely as a convenience in arranging the parts.

The light rays thus pass from the lamp 15 through the reticle $R_1$ and semi-transparent mirror 37 and into one side of the hypotenuse 50 of the prism 43; and, after a double reflection from the sides 51 and 51', again emerge from the other side of the hypotenuse 50, and are then reflected by the mirror 48 to the collimating lens 49. Such a device thus constitutes, in effect, a collimator with the prism 43 to be tested in position in the path of the converging light rays of the telescope between the reticle $R_1$ and the collimating lens 49.

In order to reflect the light rays back through the collimating lens 49 toward the reticle $R_1$, I provide a reflecting means positioned beyond the lens 49 and in the path of the parallel rays passing therethrough. This reflecting means comprises, in the present embodiment, a front coated semi-transparent mirror 55 behind which is positioned a prism 56 arranged in the manner best shown in Figs. 2 and 4. A color filter 57, such as a green Wratten Filter No. 56 is positioned between the mirror 55 and the prism 56 for a purpose to be later described. These reflecting members direct the rays back through the system to the semi-transparent mirror 37 where they are reflected and brought to a focus at the reticle $R_2$ which is positioned at the virtual image of $R_1$ formed by the mirror 37. However, when looking through the eye-piece 44 at the reticle $R_2$ the real image of $R_1$ will be seen. We thus have an auto-collimating system. The reticle $R_2$ preferably comprises dark lines on a transparent background such as glass, while the reticle $R_1$ comprises transparent lines on an opaque background, although other forms and designs of reticles may be used. As the parts of the apparatus have now been described, their operation for making the various tests will now be discussed in the same order in which the tests were defined above.

90° angle error

Figure 7:
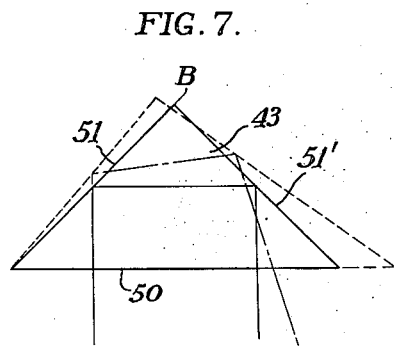

If there is an error of the 90-degree angle between the faces 51 and 51', the rays deflected from the second side of the incorrect prism will be deviated and will not be parallel to the reflected rays of the correct prism, as shown in broken lines in Fig. 7. These errors will appear at $R_2$ by having the image of $R_1$ to the right or left of the center line of $R_2$, the actual direction and amount depending, of course, on the direction and amount of displacement of 90-degree error.

Pyramid error

Pyramid error gives rise to a deviation which is at right angles to that caused by the 90-degree error, or at right angles to the plane of the diagram shown in Fig. 7. No other error in the prism compensates for pyramid error, and its value is read as the actual vertical displacement of the image $R_1$ and $R_2$. In binoculars, due to the fact that the two prisms are positioned at right angles to each other, the deviation of the emerging ray due to pyramid error in one prism may be compensated for by displacing the other prism in a plane normal to that of Fig. 7 so that the final image will be located correctly.

Sharp dimension error

Figure 5:
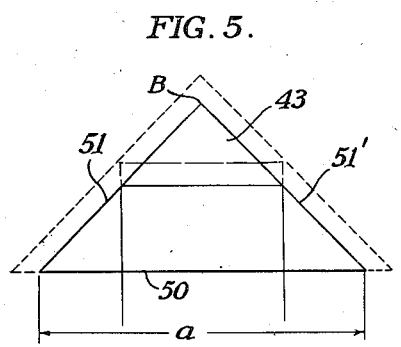

Fig. 5 shows a correct prism in solid line, and a prism, as shown dotted, having a sharp dimensional error, designated by the letter $a$. It will be apparent that the light path through the prism having such an error, shown in broken line, is longer than through the correct prism, as shown in solid line. The result of such an error is to cause the image of $R_1$ to be brought to a focus and appear between $R_2$ and the mirror 37. If, however, the prism having the error was smaller than the correct prism, then the path therethrough will be shorter than through the correct prism, and the focused image of $R_1$ would fall between $R_2$ and the viewing device 44. In order to measure this error, the reticle $R_1$ is moved axially, by means of the sleeve 19 and arm 22 or springs 24 so that the image of $R_1$ is brought to a sharp focus at $R_2$. During this movement, small protuberances 60 on the arm 22 engage spaced stops 61. Each of these stops 61 is formed on the end of a spring member 62 carried by a sliding member 63 adjustably mounted on the side 11 of the apparatus. The position of the stops 61 may be adjusted for various tolerances. If the focus of $R_1$ at $R_2$ is secured with the protuberances 60 positioned somewhere between the stops 61, then the sharp dimension error is within the established tolerance limits. If, on the other hand, it is necessary to move a protuberance past one of the stops in order to secure the focus of $R_1$ at $R_2$, then the error is too great and the prism is rejected. As a focal point is best determined if the focus is passed through, it is preferred to use spring stops so that the protuberances may pass thereover during the focusing operation.

The resolution may be checked by observing at $R_2$ the image of a resolution chart placed at $R_1$.

45-degree angle and bevel errors

Figure 6:
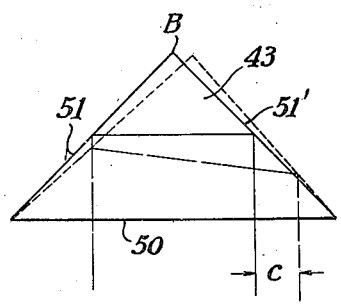
Figure 8:
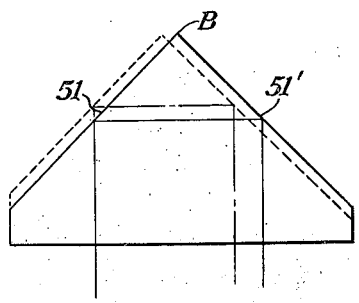

Fig. 6 shows the result of the lateral displacement of the 90-degree edge B due to unequal 45-degree angles. Such displacement causes the emerging rays to be displaced from but to be parallel to that of the correct prism, as indicated at C. Such errors are not distinguishable from centering errors of the 90-degree edge B caused by unequal bevels at the ends of the hypotenuse, as shown in Fig. 8. Such centering errors are due to the fact that one bevel cuts off more material than the other. Referring to Fig. 8, the correct dimensions of prism and the path of the light rays are shown in full line. If one of the bevels is higher than the other, the width of the prism being the same, the outline of the prism and the path of the rays will be as shown in dotted line. It is to be understood that Figs. 5 to 7, which are used to explain the errors, are not to be taken as indicating that bevels are not ordinarily used. Both the 45-degree errors and the bevel error cause displacement of the emerging beam. In addition, as mentioned above, the 90-degree error causes a deviation. The final result of the displacement and deviation errors is indicated by the failure of $R_1$ to line up with $R_2$. These errors may, however, compensate each other to bring $R_1$ into proper relation with $R_2$ so that it is not known whether such errors are lacking or whether they merely compensate each other. If, however, $R_1$ and $R_2$ do not line up when the prism is moved to the limit of its movement in seat 42, the prism 43 may be turned around and tested. This reversal serves to reverse the displacement, not the deviation error. If, after reversal, $R_1$ and $R_2$ continue in proper relation, the prism is satisfactory. If not, it is rejected, or possibly marked for special assembly. In the assembly of such prisms in binoculars, however, such marked prisms may be assembled with prisms having suitable compensating pyramid errors. This is possible because the pyramid error is at right angles to the other errors mentioned above and the principal planes of the two prisms are at right angles.

In determining the deviation and displacement errors, as above described, only the mirror 55 is required, and if only these errors are to be determined, the semi-transparent mirror 55 could be replaced by a fully reflecting plane mirror and the prism 56 could be eliminated. Also, the deviation and displacement errors, as indicated by the above-described apparatus, are twice the value of those which such a prism would give when used in a binocular.

Rotation errors

In addition to these deviations and displacement errors, the prism 43 may have rotational errors caused by the fact that the intersections of the hypotenuse and the bases 64 are not normal to the 90-degree edge B. Such a defect will result in a rotation of the prism in its seat about the axis X—X of Fig. 4, or about an axis parallel to face 50. In determining such rotational errors, the 90-degree prism 56 is required. If only the mirror 55 is used, it will be found that the image will be the same whether or not the prism has rotational errors. However, with the addition of the prism 56 it will be found that the final image will have a twist which is four times that of the twist or rotation of the prism 43. In other words, if the prism 43 is rotated through an angle $\theta°$ due to its rotational error, the final image will be rotated $4\theta°$, the latter being twice the rotation which would occur if the defective prism were used in a binocular. Thus the prism 56 enables the detection of the rotational error in the prism 43. If such errors are found to exist, the prism 43 is manually rotated, by a permitted amount, in its seat by the observer, and if such a movement, within the prescribed tolerance, is sufficient to correct the error, then the latter is within permissible tolerance limits and the prism may be suitable for use in binoculars. If, however, such manual rotation does not correct the error, the prism is unsuitable and is rejected.

In order that such rotational errors can be more readily distinguished from deviation and displacement errors, a color filter 57 is positioned between the mirror 55 and the prism 56 in the position illustrated in Figs. 2 and 4. This filter is preferably a Wratten No. 56 green filter, and serves to color the image which goes through the prism 56 green, this colored image is the one that shows the rotational error of the prism 43. Thus if the prism has rotational error, the green image will be rotated or twisted relative to the reticle $R_2$ to indicate clearly that such error is present, and the amount of such rotation or twist will be four times the rotational error of the prism.

The above described apparatus thus enables an operator to ascertain readily, quickly, and easily whether the prism under test has deviation, displacement, or rotational errors, and also the amount of such errors. Also the operator can check quickly to see whether these errors are within the permissible tolerance limits set up and thereby determine the suitability of the prism for use in binoculars.

While the above apparatus has been specifically described in connection with the testing of Porro prisms in converging light to determine the different prism errors, it is to be understood and it is contemplated that such an apparatus is also adapted for testing various other types of prisms such, for example, as penta prisms, rhomboid prisms, roof prisms, etc. in converging light to ascertain the various errors of such other prisms as require converging light for their determination. In each case, the prism to be tested is positioned in a converging light beam rather than in a beam of parallel rays. It is apparent, however, that the specific positions of the various elements of the testing apparatus may have to be slightly rearranged to suit the particular prism being tested, but such rearrangements will readily suggest themselves to those in the art. Also the term "prism" when used in the specification and claims is intended to cover a single prism member or a plurality of members which are arranged, either cemented or otherwise, to form in effect a single prism.

While one embodiment of the invention has been disclosed, it is to be understood that the inventive idea may be carried out in a number of ways. This invention is, therefore, not to be limited to the precise details described but is intended to cover all variations and modifications thereof falling within the scope of the appended claims.

I claim:

1. Apparatus for testing a Porro prism comprising a reticle, means for illuminating the reticle, means for holding said Porro prism to receive a divergent light beam from the reticle through one end of the hypotenuse face of the prism and to reflect the light beam successively at the two sides of the prism out through the other end of the hypotenuse face, a collimating objective positioned optically at its focal length from the reticle to receive the divergent beam from the prism and to collimate it, reflecting means positioned to receive the collimated light and to reflect it back through the collimating objective which converges the beam and sends it through the Porro prism into focus forming a reticle image at the focal plane of the collimator, reflector means for separating the returning convergent beam from the divergent one and said focal plane from the plane of the reticle, a second reticle positioned in said focal plane, and an eyepiece for observing said second reticle and the image of the first reticle in said focal plane.

2. Apparatus for testing a Porro prism comprising a reticle, means for illuminating the reticle, means for holding said Porro prism to receive a divergent light beam from the reticle through one end of the hypotenuse face of the prism and to reflect the light beam successively at the two sides of the prism out through the other end of the hypotenuse face, a collimating objective positioned optically at its focal length from the reticle to receive the divergent beam from the prism and to collimate it, plane reflecting means substantially orthogonal to the collimated beam positioned to receive and reflect part of the collimated beam back through the collimating objective, roof reflecting means with its roof edge perpendicular to the collimated beam also positioned to receive and reflect part of the collimated beam back through the collimating objective which converges both parts and sends them through the Porro prism into focus forming two reticle images at the focal plane of the collimator, reflector means for separating the returning convergent beams from the divergent one and said focal plane from the plane of the reticle, a second reticle positioned in said focal plane and an eyepiece for observing the two images in said focal plane.

3. Apparatus according to claim 2 including a color filter located in the collimated beam between the collimating objective and only one of the two reflecting means to color one of said two images.

4. Apparatus according to claim 2 in which said roof edge is optically at right angles to the dihedral edge of the Porro prism.

5. Apparatus for testing a Porro prism comprising a reticle, means for illuminating the reticle, means for holding said Porro prism to receive a divergent light beam from the reticle through one end of the hypotenuse face of the prism and to reflect the light beam successively at the two sides of the prism out through the other end of the hypotenuse face, a collimating objective positioned optically at its focal length from the reticle to receive the divergent beam from the prism and to collimate it, semi-transparent plane reflecting means substantially orthogonal to the collimated beam positioned to receive the collimated beam and reflect part of it back through the collimating objective, roof reflecting means with its roof edge perpendicular to the collimated beam positioned behind the semi-transparent plane reflecting means to receive the transmitted part of the collimated beam and to reflect it back partly through the semi-transparent plane reflecting means and the collimating objective which converges both parts and sends them through the Porro prism into focus forming two reticle images at the focal plane of the collimator, reflector means for separating the returning convergent beams from the divergent one and said focal plane from the plane of the reticle, a second reticle positioned in said focal plane and an eyepiece for observing the two images in said focal plane.

6. Apparatus according to claim 5 including a color filter between the semi-transparent plane reflecting means and the roof reflecting means to color one of said two images.

7. Apparatus according to claim 5 in which said roof edge is optically at right angles to the dihedral edge of the Porro prism.

JOHN H. McLEOD.

REFERENCES CITED

The following references are of record in the file of this patent:

UNITED STATES PATENTS

| Number | Name | Date |
| --- | --- | --- |
| 921,773 | Wild | May 18, 1909 |
| 1,866,718 | Mihalyi | July 12, 1932 |
| 2,266,741 | Crane et al. | Dec. 23, 1941 |
| 2,406,807 | Colbath | Sept. 3, 1946 |